(12) United States Patent
Barbero et al.

(10) Patent No.: US 8,796,977 B2
(45) Date of Patent: Aug. 5, 2014

(54) VOLTAGE REGULATOR FOR DC MOTORS

(75) Inventors: Maurizio Barbero, Turin (IT); Franco Quagliata, Viarigi (IT)

(73) Assignee: Gate S.R.L., Turin (IT)

( * ) Notice: Subject to any disclaimer, the term of this patent is extended or adjusted under 35 U.S.C. 154(b) by 146 days.

(21) Appl. No.: 13/416,638

(22) Filed: Mar. 9, 2012

(65) Prior Publication Data

US 2012/0229067 A1 Sep. 13, 2012

(30) Foreign Application Priority Data

Mar. 10, 2011 (IT) ................. TO2011A0213

(51) Int. Cl.
*H02P 5/68* (2006.01)
*G01R 31/06* (2006.01)

(52) U.S. Cl.
USPC ............................ 318/490; 388/811; 388/903

(58) Field of Classification Search
USPC ......................... 318/490, 400.3, 770, 808, 812
See application file for complete search history.

(56) References Cited

U.S. PATENT DOCUMENTS

| | | | | |
|---|---|---|---|---|
| 5,957,663 A * | 9/1999 | Van Houten et al. | ........... | 417/13 |
| 7,444,070 B2 * | 10/2008 | Hahn et al. | .................... | 388/809 |
| 8,089,241 B2 * | 1/2012 | Yamakawa et al. | ........... | 318/812 |
| 2007/0247091 A1 * | 10/2007 | Maiocchi | ....................... | 318/254 |
| 2008/0084171 A1 * | 4/2008 | Leehey et al. | ................... | 318/34 |
| 2009/0026993 A1 * | 1/2009 | Nishibe et al. | ................ | 318/490 |
| 2009/0155103 A1 * | 6/2009 | De Filippis et al. | ........ | 417/423.5 |
| 2009/0195205 A1 * | 8/2009 | Ide | ................ | 318/490 |
| 2009/0237019 A1 * | 9/2009 | Yamakawa et al. | ...... | 318/400.09 |
| 2010/0090636 A1 * | 4/2010 | Takahashi et al. | ............ | 318/490 |
| 2010/0301786 A1 * | 12/2010 | Gallegos-Lopez et al. | ....................... | 318/400.02 |

FOREIGN PATENT DOCUMENTS

| | | | |
|---|---|---|---|
| JP | 10014286 A | * | 1/1998 |
| JP | 11275893 A | * | 10/1999 |
| JP | 2007252056 A | * | 9/2007 |

* cited by examiner

*Primary Examiner* — Eduardo Colon Santana
*Assistant Examiner* — Said Bouziane
(74) *Attorney, Agent, or Firm* — Muncy, Geissler, Olds & Lowe, P.C.

(57) ABSTRACT

A voltage regulator for a pair of electric motors has an input for a signal indicative of the desired speed for the motors and a pulse width modulation control circuit device. A control module provides a conditioning signal to the control circuit to output to the motors a square wave voltage having a duty-cycle which varies according to a predetermined function of the signal applied to the input of the regulator. The control circuit device has first and second electronic solid state switches associated with the motor and controlled by the control module.

5 Claims, 8 Drawing Sheets

FIG. 1

(PRIOR ART)

FIG. 2

(PRIOR ART)

VOLTAGE REGULATOR FOR DC MOTORS

CROSS REFERENCE TO RELATED APPLICATIONS

This non-provisional patent application claims priority under 35 U.S.C. §119(a) from Patent Application No. TO 2011A000213 filed in Italy on Mar. 10, 2011.

FIELD OF THE INVENTION

The present invention relates to a voltage regulating device and method for a pair of direct-current electric motors, particularly (though not exclusively) for electric fans, for example, for cooling an internal-combustion engine of a motor vehicle.

BACKGROUND OF THE INVENTION

Voltage regulators are known of the type comprising: an input for an electric control signal which indicates the desired speed of the motor, and a control circuit device with pulse width modulation (PWM), which is connected between a direct-current supply voltage source and the motor and which is capable of applying to the motor a square wave voltage which is obtained from the voltage produced by that source and which has a duty cycle which varies in accordance with a predetermined function of that control signal.

Conventionally, in order to vary the rotation speed of two electric fans on board motor vehicles, there are used two separate electronic regulating devices, each one associated with a motor of an electric fan, respectively. In that manner, the two motors are controlled in a completely independent manner. Advantageously, those electronic regulating devices are integrated in a single voltage control and regulating device.

Figure 1:
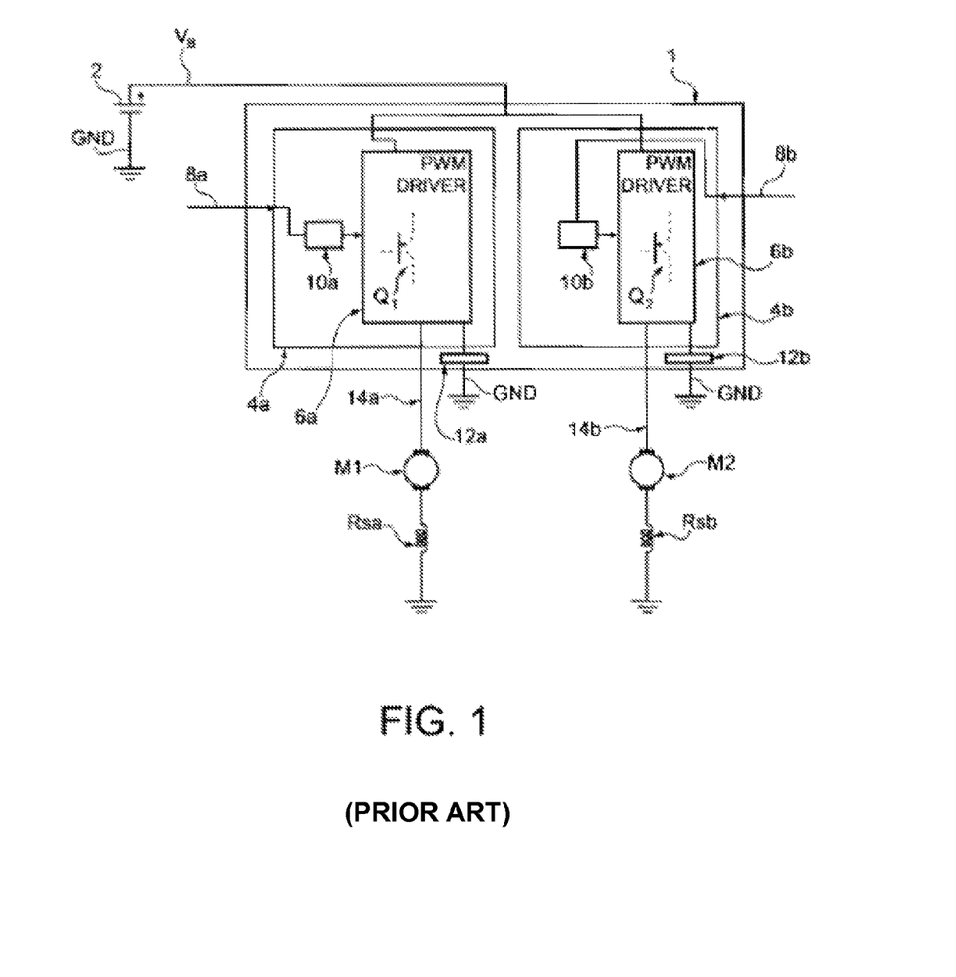
FIG. 1, which has already been described, is a partially schematic electric circuit diagram of an electronic voltage regulator according to a first piece of prior art.

FIG. 1 is a partially schematic electric circuit diagram of a voltage control and regulating device according to the above-described prior art.

In particular, a first and a second direct-current electric motor are designated M1 and M2, respectively, such as electric fan motors for a radiator of an internal-combustion engine in a motor vehicle.

Each motor M1 and M2 is connected to a voltage control and regulating device which is generally designated 1. That device 1 is connected to a direct-current supply voltage source 2, such as a battery, and comprises two electronic regulating devices which are generally designated 4a and 4b. Each electronic regulating device 4a and 4b is connected to the first and second motor M1 and M2 by means of a connection branch 14a and 14b, respectively.

Each electronic regulating device 4a and 4b comprises: an input 8a, 8b for an electric control signal which indicates the desired speed for the associated motor M1, M2; a control circuit device with pulse width modulation (PWM) which is generally designated 6a and 6b, respectively; and a control module 10a, 10b which is capable of supplying to the associated PWM control device 6a, 6b a conditioning signal in such a manner that it applies to the motor M1, M2 a square wave voltage obtained from the voltage VB produced by the battery 2, respectively, and having a duty cycle DC which varies in accordance with a predetermined function of the electric control signal applied to the input 8a, 8b of the electronic regulating device 4a and 4b, respectively.

In a manner known per se, each PWM control device 6a, 6b comprises at least one electronic solid state switch, such as a MOSFET transistor Q1, Q2 which is controlled by the associated control module 10a, 10b.

Each PWM control circuit device 6a, 6b is connected at one side to the positive pole of the voltage source 2 and to the earth GND at the other side.

Advantageously, in series with each PWM control circuit device 6a, 6b, there is provided at the side of the earth GND a device 12a, 12b, respectively, for controlling the polarity of the voltage source 2 which is provided to prevent inversion of the polarity thereof. Preferably, those control devices 12a, 12b each comprise a MOSFET transistor (not shown in the Figure) in a manner known per se.

Advantageously, in series with each motor M1, M2, there is provided a shunt resistor Rsa, Rsb which is capable of allowing, in a manner known per se, monitoring of the current flowing in the motor M1, M2, respectively, and therefore the correct operation thereof. Although the shunt resistors Rsa, Rsb are illustrated outside the regulators 4a, 4b for the sake of simplicity, they belong conceptually to the regulators and may be constructed inside them.

There is associated with each electronic regulating device 4a, 4b, in a manner known per se, a filtering circuit (not shown in the Figure) which is capable of ensuring the correct operation of the associated PWM control circuit device 6a, 6b.

The solution described with reference to FIG. 1 has the disadvantage of being costly because it requires substantial duplication of all the electronic devices. In particular, two filtering circuits which are costly and complex to construct are necessary.

The above-mentioned disadvantages have been overcome by adopting a single electronic voltage regulator which controls two separate motors which are positioned in parallel between the voltage source 2 and the earth GND.

Figure 2:
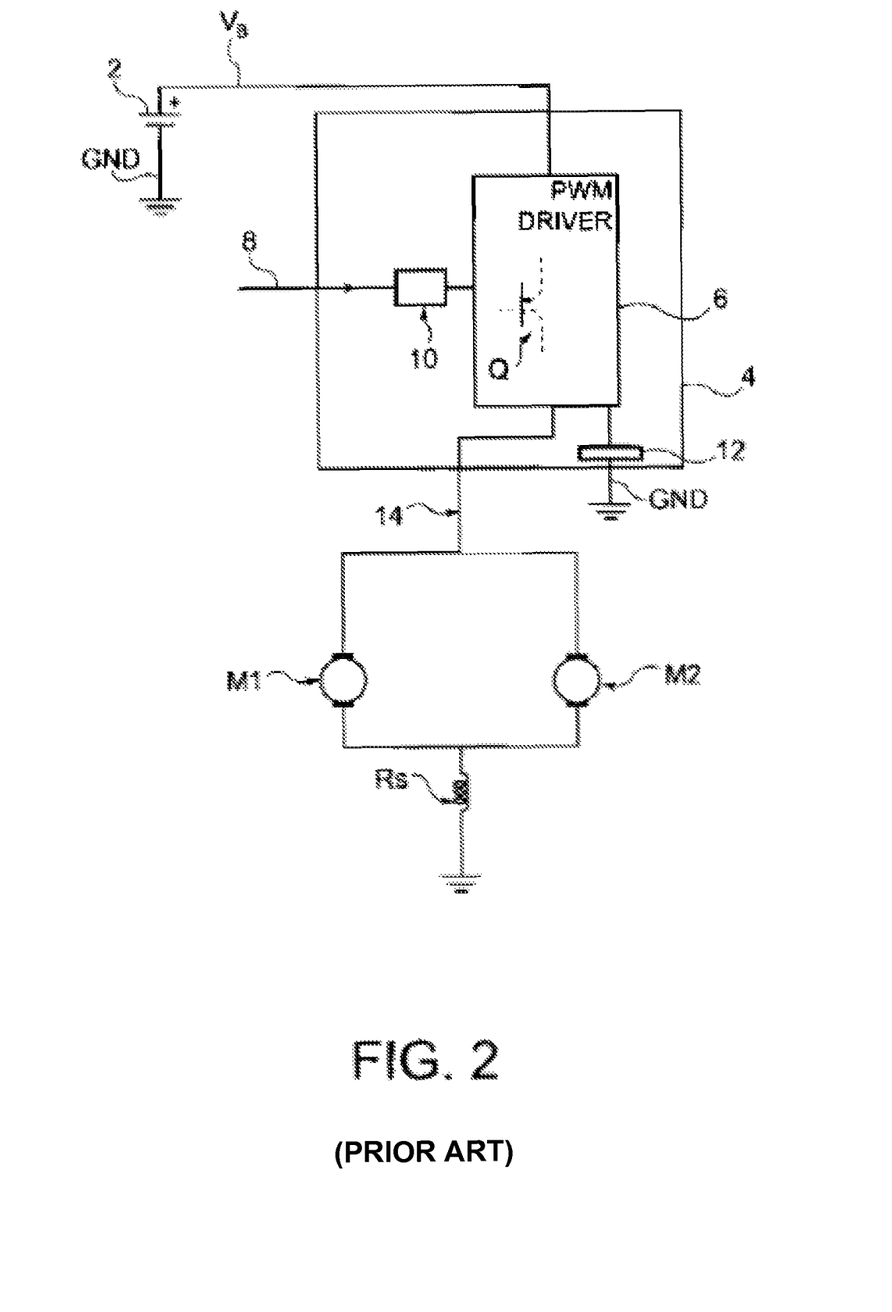
FIG. 2, which has already been described, is a partially schematic electric circuit diagram of an electronic voltage regulating device according to a second piece of prior art.

FIG. 2 illustrates a partially schematic electric circuit diagram of an electronic voltage regulating device according to the additional prior art set out above. Elements which are similar to those illustrated in FIG. 1 have been indicated with the same reference numerals.

The two motors M1 and M2 which are positioned substantially parallel with each other are then connected by means of a single connection branch 14 to the electronic regulating device 4.

In the configuration of FIG. 2, a reduction in the costs is obtained because the number of devices used is reduced; in particular, a single filtering circuit is sufficient.

However, the possibility of controlling each motor in a manner independent of the other is lost and therefore the possibility of independently controlling any failures which are established in one of the two motors is also lost. This means that, if one motor fails, the other can also no longer be used.

An object of the present invention is to provide a solution which allows the construction of a voltage regulator in which it is possible to independently control the failures which may be established in each motor and which is simultaneously less expensive than the above-discussed prior art.

SUMMARY OF THE INVENTION

Hence there is a desire for a less expensive voltage regulator for controlling two motors that can also independently control the failures which may occur in each motor.

Accordingly, in one aspect thereof, the present invention provides a voltage regulator for a pair of electric motors placed substantially in parallel between a voltage source and the earth, the regulator comprising: an input for an electric control signal indicative of the desired speed for the motors;

a pulse width modulation control circuit device connected at one side to the positive pole of the voltage source and at the other to the earth; a control module arranged to provide to the pulse width modulation control circuit device a conditioning signal so that the pulse width modulation control circuit device applies to the motors a square wave voltage obtained from the voltage produced by the source and having a duty-cycle which varies according to a predetermined function of the electric control signal applied to the input of the electronic regulator device, wherein the control circuit device comprises a first and a second electronic solid state switch associated with a respective motor and controlled by the control module.

Preferably, a processing module is provided for: acquiring and processing signals representative of the current and of the voltage of the motors coming from, respectively, a current comparator and motor voltage monitoring devices; acquiring and processing signals representative of the voltage associated with the electronic switches coming from switch voltage monitoring devices; and sending to the control module at least a control signal based on the current and voltage signals.

Preferably, a control device is provided in series with the control circuit device and arranged to block inversion of the polarity of the voltage source.

Preferably, the first and the second solid state electronic switches are MOSFET transistors.

According to a second aspect, the present invention provides a method of voltage regulation for a pair of electric motors connected to the electronic regulator described above, the method comprising sequentially the steps of: acquiring, from the current comparator, a current signal representative of the total current flowing within the two motors; verifying whether the current signal exceeds a predetermined current threshold value and, in positive case, determining which of the two motors is in short-circuit; acquiring, from the switch voltage monitoring devices, for each MOSFET transistor, a drain-source voltage signal representative of the drain-source voltage of those transistors; verifying whether the drain-source voltage signal exceeds a predetermined drain-source voltage threshold value and, in positive case, determining which of the two motors is in short-circuit; switching-off repeatedly and simultaneously the two motors for a predetermined time so as not to influence the correct functioning thereof and verifying, for each motor, by means of the motor voltage monitoring devices and during the switching-off, the presence of a motor voltage signal representative of back electromotive forces associated with each motor; obtaining, in case of presence of the back electromotive forces, the information that the respective motor is regularly connected; verifying whether the current signal exceeds a predetermined alarm value and, in positive case, limiting the current flowing in the motors by reducing progressively the voltage applied to the motors; and verifying, by means of the motor voltage monitoring devices, whether the total voltage applied to the motors is reduced until a first voltage threshold value is reached and, in positive case, determining which motor is overloaded.

Preferably, the operations of: verifying whether the current signal exceeds a predetermined current threshold value and, in positive case, determining which of the two motors is in short-circuit, and verifying whether the drain-source voltage signal exceeds a predetermined drain-source voltage threshold value and, in positive case, determining which of the two motors is in short-circuit, each comprise the steps, after the verification steps, of: switching-off both of the motors; switching-on the first motor for a predetermined time period so as to ensure, in case of failure of the first motor, the exceeding of the current threshold value; verifying whether the current signal exceeds the current threshold value and, in positive case, obtaining the information that the first motor is in short-circuit; switching-off the first motor; switching-on the second motor for a predetermined time period so as to ensure, in case of failure of the second motor, the exceeding of the current threshold value; and verifying whether the current signal exceeds the current threshold value and, in positive case, obtaining the information that the second motor is in short-circuit.

Preferably, the operation of verifying whether the total voltage applied to the motors is reduced until a first voltage threshold value is reached and, in positive case, determining which motor is overloaded, comprises the steps of: switching-off both of the motors; switching-on the first motor; verifying whether the voltage of the first motor is reduced until a second threshold value is reached and, in positive case, obtaining the information that the first motor is overloaded; switching-off the first motor; switching-on the second motor; and verifying whether the voltage of the second motor is reduced until the second threshold value is reached and, in positive case, obtaining the information that the second motor is overloaded.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 3:
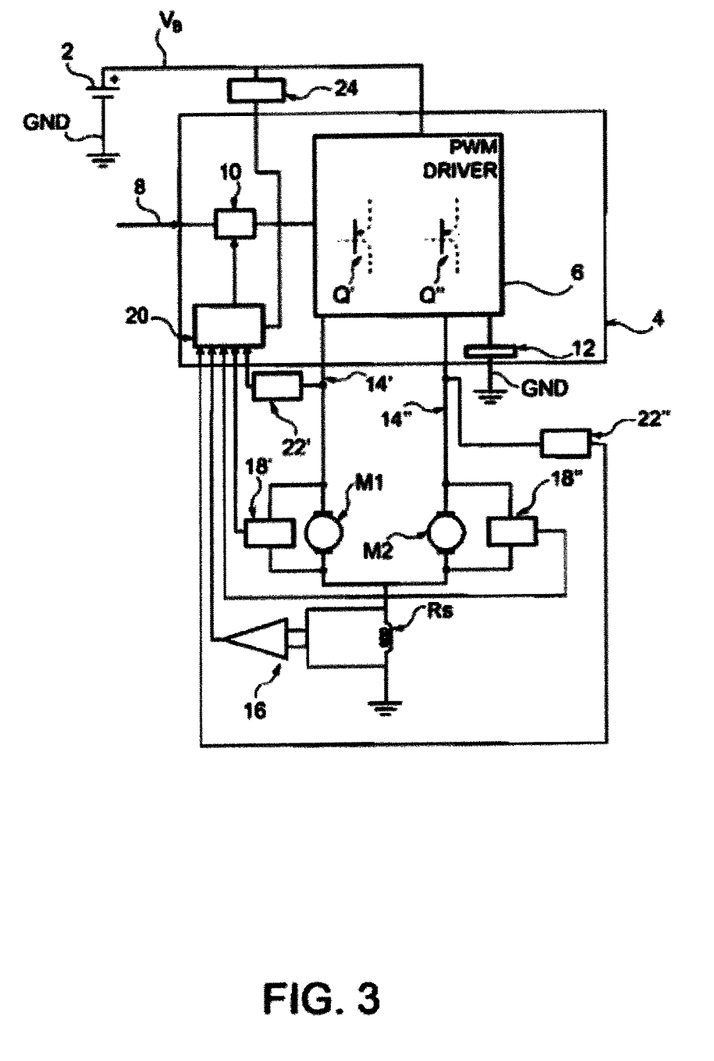
FIG. 3 is a partially schematic electric circuit diagram of an electronic voltage regulator according to the present invention.

In FIG. 3, a first and a second direct-current electric motor are designated M1 and M2, respectively, such as motors for electric fans for a radiator of an internal-combustion engine in a motor vehicle. Both the motors M1 and M2 are directly connected to an electronic regulating device 4 by means of first and second connection branches 14' and 14", respectively. That device 4 is connected to a direct-current supply voltage source 2, such as a battery.

Advantageously, in series with the motors M1, M2, there is provided a shunt resistor Rs which is capable of allowing monitoring of the correct operation of the motors M1, M2. In particular, the total current which flows in the two motors M1, M2 is measured by using a current comparator 16 which is connected to the terminals of the shunt resistor Rs. Although the shunt resistor Rs is illustrated outside the regulator 4 for the sake of simplicity, it belongs conceptually to the regulator and may be constructed inside it.

The motors M1 and M2 are positioned substantially parallel between the voltage source 2 and the earth GND. Connected to the terminals of each motor M1, M2 is a device for monitoring the motor voltage 18', 18" which is provided to measure, as described below, the voltage of those motors M1, M2, respectively.

The electronic regulating device 4 comprises an input 8 for an electric control signal which indicates the desired voltage for the motors M1, M2, a control circuit device 6 with pulse width modulation (PWM), a control module 10 and a processing unit 20.

The PWM control device 6 comprises a first and a second electronic solid state switch, such as MOSFET transistors Q', Q", which are controlled by the control module 10. Each MOSFET Q', Q" is associated with a motor M1, M2, respectively. The PWM control circuit device 6 is connected at one side to the positive pole of the voltage source 2 and to the earth GND at the other side.

The control module 10 is capable of supplying to the PWM control device 6 a conditioning signal in such a manner that it applies to the motors M1, M2 a square wave voltage obtained from the voltage $V_B$ produced by the battery 2, and having a duty cycle DC which varies in accordance with a predetermined function of the electric control signal applied to the input 8 of the electronic regulating device 4. The control module 10 is provided to synchronously control the two gates of the two MOSFET transistors Q', Q".

The processing module 20, preferably a microcontroller, is provided to acquire and process, as described below, the signals from the current comparator 16, and from the devices for monitoring the motor voltage 18', 18" and in order to transmit at least one control signal to the control module 10 on the basis of the signals acquired.

Advantageously, in series with the PWM control circuit device 6, there is provided at the side of the earth GND a device 12 for controlling the polarity of the voltage source 2 which is provided to prevent inversion of the polarity thereof. Preferably, that control device 12 comprises a MOSFET transistor (not shown in the Figure) in a manner known per se.

A device for monitoring the drain-source voltage 22', 22" is connected to each connection branch 14' and 14" and is connected to the processing module 20 and provided to establish, as described below, the drain-source voltage of the MOSFET transistors Q', Q".

Although the current comparator 16, the devices for monitoring the motor voltage 18', 18" and the devices for monitoring the drain-source voltage 22', 22" are illustrated outside the regulator 4 for the sake of simplicity, they belong conceptually to the regulator and may be constructed inside it.

There will now be described the voltage regulating method according to the invention in which the following measurements are carried out:
  establishing the current which flows through the shunt resistor Rs using the current comparator 16;
  measuring the drain-source voltage $V_{DS1}$ of the first MOSFET transistor Q' using the device for monitoring the drain-source voltage 22';
  measuring the drain-source voltage $V_{DS2}$ of the second MOSFET transistor Q" using the device for monitoring the drain-source voltage 22".

Owing to a combination of the above-mentioned measurements which will now be described in detail, it is possible to identify the following failures independently for each motor M1 and M2:
  short-circuited motor;
  disconnected motor;
  overloaded motor; and
  stopped motor.

During operation of the motors, the processing module 20 monitors, in a continuous manner, at regular time periods, and in sequence, the signals from the current comparator 16, from the devices for monitoring the motor voltage 18', 18 and from the devices for monitoring the drain-source voltage 22', 22" and, on the basis of the values obtained, actuates different verification methods as will now be described.

Short-Circuited Motor

When a motor has been short-circuited, it is possible to verify both that the drain-source voltage $V_{DS}$ of the MOSFET transistor exceeds a predetermined threshold value and that the current established at the terminals of the shunt resistor Rs exceeds a predetermined threshold value. Often, it is a priori impossible to know which of the two occurrences of excess occurs first and, therefore, it is necessary to control both the extents which are measured with the devices 22', 22" for monitoring the drain-source voltage and with the current comparator 16, respectively.

Figure 4:
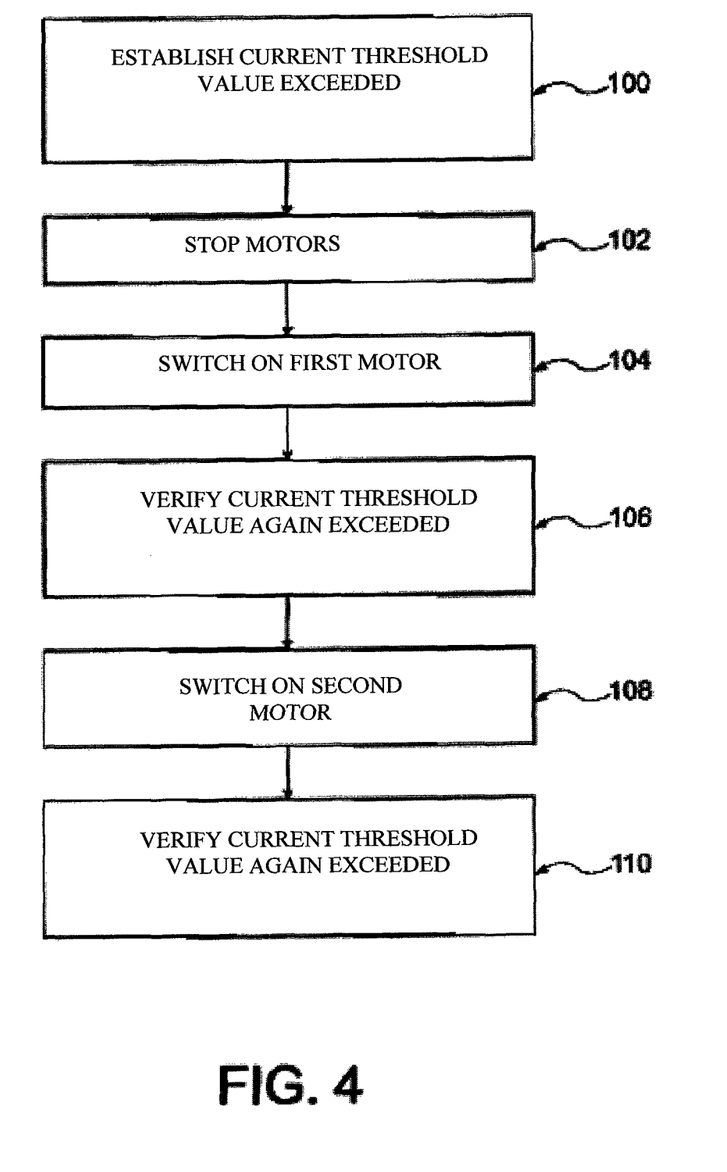
FIG. 4 is a flow chart of the steps of the method for detecting a failure in relation to a short-circuited motor in the event of a current threshold value being exceeded.

In order to establish a failure relating to a short-circuited motor in the event of the current threshold value being exceeded and in order to identify the channel involved (the channel relating to the first motor M1 or the second motor M2), the operations illustrated in the flow chart of FIG. 4 are carried out.

In step 100, the processing module 20 establishes, at a given time, that the current value measured by the current comparator 16 exceeds the current threshold value. At that point, it transmits to the control module 10 a signal requesting stoppage of the motors, following which the control module 10 stops both motors M1, M2 in step 102. Subsequently, in step 104, the first motor M1 is switched on for a predetermined period of time so as to ensure, in the event of a failure of that first motor M1, that the current threshold value is exceeded again.

In step 106, the processing module 20 verifies whether the current threshold value has effectively been exceeded and, if so, obtains the information that the first motor M1 has been short-circuited. Otherwise, the first motor M1 is operational.

Subsequently, the analysis of the second motor M2 continues and, after switching off the first motor M1, the second motor M2 is switched on in step 108 for a predetermined period of time so as to ensure, in the event of a failure of that second motor M2, the current threshold value is again exceeded.

In step 110, the processing module 20 verifies whether the current threshold value has effectively been exceeded and, if so, it obtains the information that the second motor M2 has been short-circuited. Otherwise, the second motor M2 is operational.

The pieces of information relating to the failures of the motors M1, M2 are transmitted by the processing module 20 to a remote station in a manner which is known per se.

Figure 5:
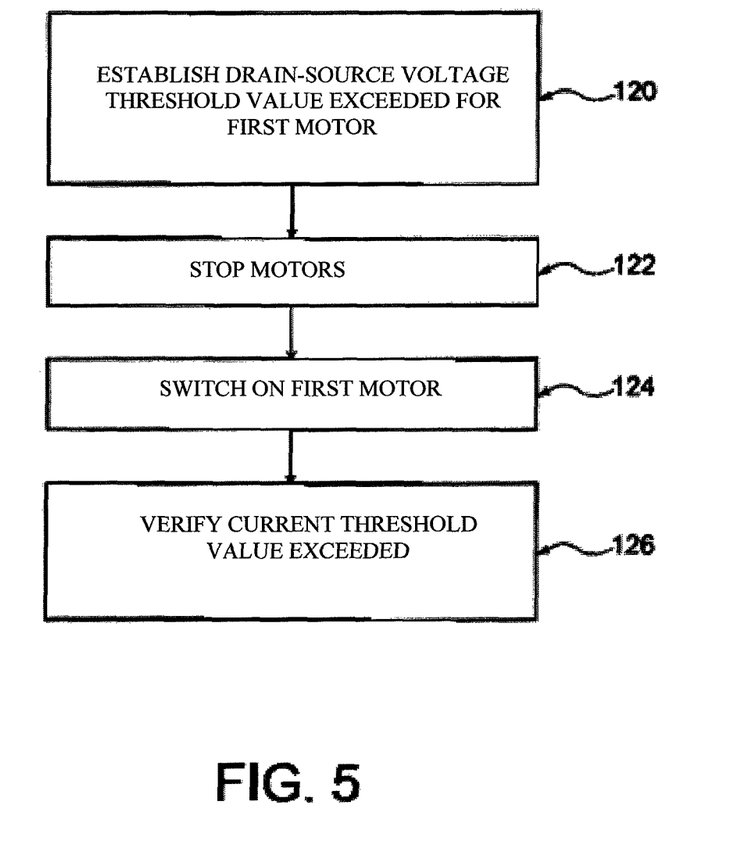
FIGS. 5 and 6 are flow charts of the steps of the method for detecting a failure in relation to a short-circuited motor in the event of a drain-source voltage threshold value being exceeded.
Figure 6:
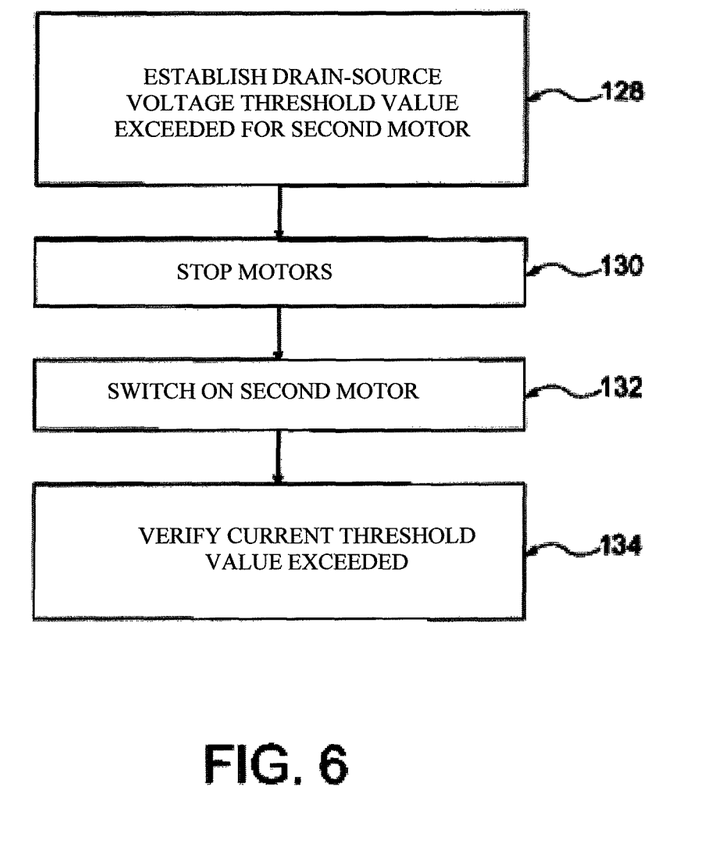

In order to establish a failure relating to a short-circuited motor, in the event of the drain-source voltage threshold value $V_{DS}$ being exceeded and in order to identify the channel involved, however, the operations illustrated in the flow charts of FIGS. 5 and 6 are carried out.

FIG. 5 is the flow chart of the operations relating to the verification of the operation of the first motor M1. In step 120, the processing module 20 establishes, at a given time, that the drain-source voltage value $V_{DS}$ of the MOSFET Q' associated with the first motor M1 exceeds the drain-source voltage threshold value. In particular, there is provided a voltage divider 24 (see FIG. 3) in the supply branch which connects the source 2 to the electronic control device 4. The device 22' for monitoring the drain-source voltage is also a voltage divider. The processing module 20 acquires the voltages present at the terminals of those voltage dividers and, firstly, calculates the difference thereof, obtaining the drain-source voltage of the MOSFET Q', and then compares it with the threshold value.

At that point, the processing module 20 transmits to the control module 10 a signal requesting stoppage of the motors, following which the control module 10, in step 122, stops both motors M1, M2. Subsequently, in step 124, the first motor M1 is switched on for a predetermined period of time so as to ensure that the current threshold value is exceeded in the event of a failure of that first motor M1. In step 126, the processing module 20 verifies whether the current threshold value has been exceeded and, if so, obtains the information that the first motor M1 has been short-circuited. Otherwise, it obtains the information that a control error of the first electronic switch Q' has been verified.

FIG. 6 is the flow chart of the operations relating to the verification of the operation of the second motor M2. In step 128, the processing module 20 establishes, at a given time, that the drain-source voltage value $V_{DS}$ of the MOSFET Q" associated with the second motor M2 exceeds the drain-source voltage threshold value. In particular, the device for monitoring the drain-source voltage 22" is a voltage divider. In this case, the processing module 20 also calculates the difference between the values of the voltages acquired by the divider 24 which is positioned on the above-described supply branch and by the device 22", thereby obtaining the drain-source voltage of the MOSFET Q", and then compares it with the threshold value. Naturally, it is possible to obtain a measurement of the drain-source voltages of the transistors with other devices which are known per se.

In the event that the drain-source voltage threshold value is exceeded, the processing module 20 transmits to the control module 10 a signal requesting stoppage of the motors, following which the control module 10, in step 130, stops both motors M1, M2 (or, if the method of FIG. 5 has already been carried out and the second motor M2 has already been stopped, only the first motor M1 is stopped). Subsequently, in step 132, the second motor M2 is switched on for a predetermined period of time so as to ensure that the current threshold value is exceeded in the event of a failure of that second motor M2.

In step 134, the processing module 20 verifies whether the current threshold value has been exceeded and, if so, obtains the information that the second motor M2 has been short-circuited. Otherwise, it obtains the information that a control error of the second electronic switch Q" has been verified.

Disconnected Motor

A disconnected motor implies that the MOSFET transistor is not being controlled correctly because the source terminal is at a random and unpredictable potential. This condition could modify the drain-source voltage $V_{DS}$ so as to make it exceed the threshold value and, in that case, it would be identified with the above-described method, but also could not cause that occurrence of excess. For that reason, in order to identify a disconnected motor, there is used a method which will now be described with reference to the chart of FIG. 7.

Figure 7:
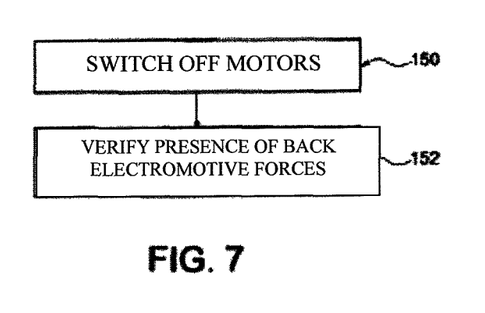
FIG. 7 is a flow chart of the steps of the method for detecting a disconnected motor.

In step 150, the two motors M1, M2 are switched off simultaneously for a predetermined time, for example, 10 ms, so as not to prejudice the correct operation thereof. That periodic deactivation is repeated at low frequency, for example, each minute. During the deactivation, in step 152, the processing module 20 verifies the presence of back electromotive forces associated with each motor M1, M2. In particular, the devices for monitoring the motor voltage 18', 18" are voltage dividers and the processing module 20 acquires the voltage measured at the terminals thereof. If those voltages (back electromotive forces) are established, the processing module 20 obtains the information that the motors M1 and/or M2 are regularly connected. If not, the motors M1 and/or M2 are not connected.

Overloaded Motor

The condition of an overloaded motor (and consequently the condition of a stopped motor) brings about an increase in the current taken up by the motor for the same voltage applied. Using the current comparator 16 and the processing module 20, it is possible to limit it without deactivating it completely as described below.

Figure 8:
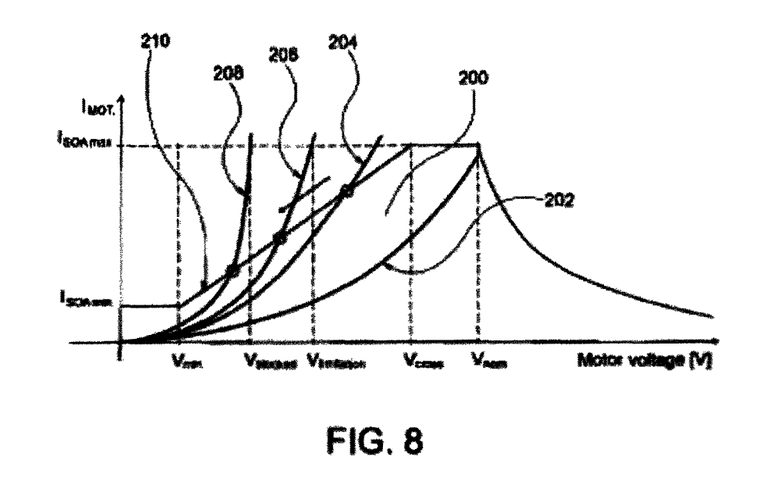
FIG. 8 is a graph of the current which flows in a motor in accordance with the supply voltage.

In the shunt resistor Rs, however, a current flows which is the total of the currents flowing in each motor M1, M2. Therefore, it would be possible to regulate only the total current and it would not be possible to know the effective current associated with each motor M1, M2. FIG. 8 is a graph of the current which flows in a motor as a function of the voltage applied to the motor itself. The zone 200 delimited by the minimum current value $I_{SOA\ min}$ and maximum current value $I_{SOA\ max}$ is the safe operating area (SOA), that is to say, the safe operating zone of the motor. The lines 202, 204 and 206, 208 represent the operation of a motor in a normal condition, partially overloaded and stopped, respectively.

Figure 9:
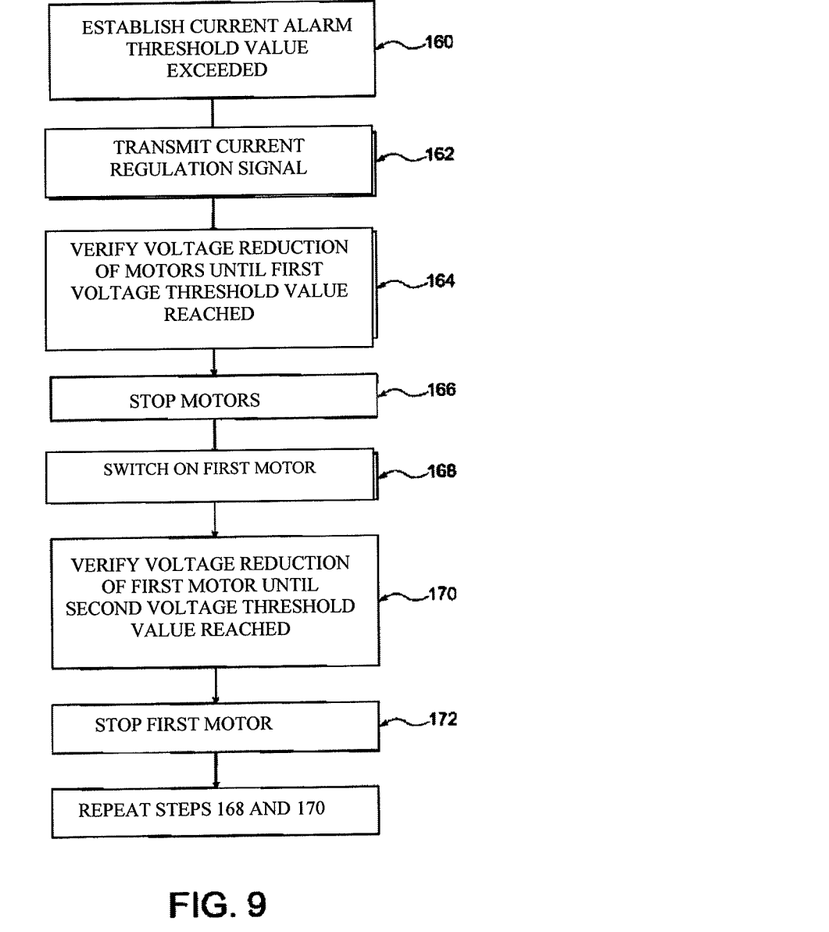
FIG. 9 is a flow chart of the steps of the method for detecting an overloaded motor.

FIG. 9 is the flow chart of the operations relating to the establishment of an overloaded motor. In the step 160, the processing module 20 establishes, on the basis of the signal which is emitted from the current comparator 16 at regular intervals, that the current which flows in the shunt resistor Rs exceeds an alarm threshold value. At that point, in step 162, it transmits a current regulation signal to the control module 10, which limits, by acting on the transistors Q', Q" in a manner which is known per se, the current which flows in the motors M1, M2, progressively reducing the voltage applied to the motors. The current is reduced in accordance with the profile 210 of the safe operating area 200.

In step 164, the processing module 20 verifies, by means of the signals being emitted from the devices for monitoring the motor voltages 18', 18", whether the total voltage applied to the motors M1, M2 has been reduced until a first voltage threshold value $V_{limitation}$ has been reached. If so, it transmits to the control module 10 a signal requesting stoppage of the motors, following which the control module 10 stops, in step 166, both motors M1, M2. Subsequently, in step 168, the first motor M1 is switched on. In step 170, the processing module 20 verifies whether the voltage of the first motor M1 has been reduced until a second voltage threshold value $V_{limitation}$ has been reached, whose value depends on the characteristics of the first motor M1. If so, it obtains the information that the first motor M1 is overloaded; otherwise, the first motor M1 is operational.

At that point, in step 172, the first motor M1 is stopped again and the operations 168 and 170 are repeated, with the second motor M2 being switched on instead of the first motor M1 so as to also carry out the analysis with reference to the second motor.

Stopped Motor

The establishment of a stopped motor is carried out by following the method described above with reference to FIG. 9, in which a smaller value $V_{blocked}$ with respect to the one selected for establishing the overloaded motor is selected as the threshold value for the voltage of the motor.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A voltage regulator, comprising:
a PWM control circuit device for connecting the positive pole of a DC voltage source and comprising a first and a second MOSFET transistor;
a first and a second connection branches connected to the PWM control circuit device for connecting two motors in parallel with each other;
an input for a control signal indicative of the desired speed for the motors;
a control module connected to the input and the PWM control circuit device and providing the PWM control circuit device a conditioning signal so that the PWM control circuit device applies to the motors a square wave voltage obtained from the voltage source via the first and second MOSFET transistor and having a duty-cycle which varies according to the control signal applied to the input of control module;
a shunt resistor that a terminal thereof is for connecting the two motors and the other terminal is connected to the earth;
a current comparator connected to the two terminals of the shunt resistor;
two motor voltage monitoring devices each configured for connecting two ends of a respect of the two motors and measuring the voltage of the respect motor;
two first switch voltage monitoring devices connected to the first and second connection branches respectively for monitoring the source voltage of the first and second MOSFET transistors;
a second switch voltage monitoring device connected to the PWM control circuit device for monitoring the drain voltage of the first and second MOSFET transistors;
a processing module connected to the current comparator, the motor voltage monitoring devices, and the first and second first switch voltage monitoring devices and configured for:
acquiring and processing signals representative of the current and of the voltage of the two motors coming from, respectively, the current comparator and the motor voltage monitoring devices;
acquiring and processing signals representative of the voltage associated with the MOSFET transistors coming from the first and second switch voltage monitoring devices; and
sending to the control module at least a control signal based on the current and voltage signals.

2. Method of voltage regulation for a pair of electric motors connected to the electronic regulator of claim 1, the method comprising sequentially the steps of:
acquiring, from the current comparator, a current signal representative of the total current flowing within the two motors;
verifying whether the current signal exceeds a predetermined current threshold value and, in positive case, determining which of the two motors is in short-circuit;
acquiring, from the first and second switch voltage monitoring devices, for each MOSFET transistor, a drain-source voltage signal representative of the drain-source voltage of those transistors;
verifying whether the drain-source voltage signal exceeds a predetermined drain-source voltage threshold value and, in positive case, determining which of the two motors is in short-circuit;
switching-off repeatedly and simultaneously the two motors for a predetermined time so as not to influence the correct functioning thereof and verifying, for each motor, by means of the motor voltage monitoring devices and during the switching-off, the presence of a motor voltage signal representative of back electromotive forces associated with each motor;
obtaining, in case of presence of the back electromotive forces, the information that the respective motor is regularly connected;
verifying whether the current signal exceeds a predetermined alarm value and, in positive case, limiting the current flowing in the motors by reducing progressively the voltage applied to the motors; and
verifying, by means of the motor voltage monitoring devices, whether the total voltage applied to the motors is reduced until a first voltage threshold value is reached and, in positive case, determining which motor is overloaded.

3. The method of claim 2, wherein the operations of:
verifying whether the current signal exceeds a predetermined current threshold value and, in positive case, determining which of the two motors is in short-circuit, and
verifying whether the drain-source voltage signal exceeds a predetermined drain-source voltage threshold value and, in positive case, determining which of the two motors is in short-circuit,
each comprise the steps, after the verification steps, of:
switching-off both of the motors;
switching-on the first motor for a predetermined time period so as to ensure, in case of failure of the first motor, the exceeding of the current threshold value;
verifying whether the current signal exceeds the current threshold value and, in positive case, obtaining the information that the first motor is in short-circuit;
switching-off the first motor;
switching-on the second motor for a predetermined time period so as to ensure, in case of failure of the second motor, the exceeding of the current threshold value; and
verifying whether the current signal exceeds the current threshold value and, in positive case, obtaining the information that the second motor is in short-circuit.

4. The method of claim 2, wherein the operation of verifying whether the total voltage applied to the motors is reduced until a first voltage threshold value is reached and, in positive case, determining which motor is overloaded, comprises the steps of:

switching-off both of the motors;
switching-on the first motor;
verifying whether the voltage of the first motor is reduced until a second threshold value is reached and, in positive case, obtaining the information that the first motor is overloaded;
switching-off the first motor;
switching-on the second motor; and
verifying whether the voltage of the second motor is reduced until the second threshold value is reached and, in positive case, obtaining the information that the second motor is overloaded.

5. The voltage regulator of claim 1 further comprising a control device that two ends thereof are respectively connected to the PWM control circuit device and the earth and configured for blocking inversion of the polarity of the voltage source.

\* \* \* \* \*